United States Patent [19]

Berrod et al.

[11] Patent Number: 4,665,985

[45] Date of Patent: May 19, 1987

[54] REVERSIBLE PLUGGING OF OIL BEARING FORMATIONS

[75] Inventors: Gerard Berrod, Villeurbanne; Robert Maurer, Saint Cyr Au Mont D'Or; Jean-Louis Brun; Philippe Bosc, both of Lyons; Pierre Allemand, Colombes, all of France

[73] Assignee: Rhone-Poulenc Recherches, Courbevoie, France

[21] Appl. No.: 702,744

[22] Filed: Feb. 19, 1985

[30] Foreign Application Priority Data

Feb. 17, 1984 [FR] France ................................. 84 02400

[51] Int. Cl.$^4$ ............................................. E21B 33/138
[52] U.S. Cl. ..................................... 166/281; 166/292
[58] Field of Search ............ 166/292, 293, 300, 705.1, 166/307, 281

[56] References Cited

U.S. PATENT DOCUMENTS

| | | | |
|---|---|---|---|
| 2,705,050 | 3/1955 | Davis et al. | 166/293 |
| 3,094,501 | 6/1963 | Wahl et al. | 166/293 |
| 3,591,542 | 7/1971 | Bonnel et al. | 166/293 |
| 3,640,343 | 2/1972 | Darley | 166/292 |
| 3,749,173 | 7/1973 | Hill et al. | 166/291 |
| 3,815,681 | 6/1974 | Richardson | 166/292 |
| 4,140,183 | 2/1979 | Holm | 166/270 |
| 4,293,340 | 10/1981 | Metz | 166/293 |
| 4,301,867 | 11/1981 | Sydarsk et al. | 166/307 |
| 4,354,875 | 10/1982 | Powers et al. | 405/263 |
| 4,521,136 | 6/1985 | Murphey | 166/292 |

*Primary Examiner*—Stephen J. Novosad
*Assistant Examiner*—William P. Neuder
*Attorney, Agent, or Firm*—Burns, Doane, Swecker & Mathis

[57] ABSTRACT

Porous, subterranean oil bearing formations penetrated by at least one wellbore are temporarily and reversibly plugged/sealed, by injecting therein a solution of an alkali metal silicate and a gelling agent therefor, permitting said alkali metal silicate and said gelling agent to harden into a relatively impermeable gel, maintaining said gel for period of plugging/sealing time desired, and thence disintegrating said relatively impermeable gel to substantially restore the initial porosity of said formation.

19 Claims, No Drawings

REVERSIBLE PLUGGING OF OIL BEARING FORMATIONS

BACKGROUND OF THE INVENTION

1. Field of the Invention

The present invention relates to the reversible sealing of porous, oil bearing rock formations. More especially, this invention relates to a process for the temporary, either total or partial sealing of such formations, utilizing certain silicates, and which is useful in a variety of drilling operations, the reconditioning of wells and the treatment of wells during production.

2. Description of the Prior Art

The use of sealing agents to reduce or eliminate the permeability of subterranean formations in the treatment of oil wells is well known to this art. Permanent or temporary sealing methods are used in drilling operations, well reconditioning, completion, stimulation and tertiary recovery. Such fluids, the use of which necessitates temporary and reversible sealing, have been described, for example, in U.S. Pat. Nos. 3,516,496 and 4,369,843. According to these processes, sealing is obtained by means of organic polymer solutions. In another process, described in U.S. Pat. No. 4,018,286, supersaturated, high density saline solutions are used. The temporary sealing processes of the prior art have the disadvantage of being uncertain in relation to their temperature behavior and their longevity, and the destruction of the polymer gel is often difficult to control and this gives rise to residual permeabilities that are lower than the initial permeabilities.

The use of silicates in the petroleum industry is also known. Silicates are used as additives to cement mixtures or resins to plug large lost circulation zones during drilling or to prevent communication between several layers of the deposit during the cementing of casings. Silicates are also used in fracturation in order to obtain viscous gels having thixotropic properties. In these operations the silicates are used essentially alone as the appropriate additives, without a gelling additive. In the form of gels, the silicates are used in tertiary recovery operations for the plugging of high permeability zones to prevent excessive water intrusion into producing wells. Generally, the silicate gels heretofore used in the oil industry were intended to form permanent seals.

SUMMARY OF THE INVENTION

Accordingly, a major object of the present invention is the provision of an improved process for the temporary or reversible sealing of underground oil bearing formations wherein the duration of the sealing, or temporary plugging, and the destruction thereof may be perfectly regulated over a controlled period of time and which makes it possible to provide a residual permeability essentially equal to the initial permeability, after flushing with a limited volume of the agent destined to destroy or disintegrate the temporary seal.

Another object of this invention is a temporary sealing process wherein the sealing agent is insensitive to water, oil and drilling or treating fluids and is resistant to elevated temperatures that may be encountered in subterranean oil formation (up to approximately 200° C).

Briefly, the present invention features a temporary sealing process in a subterranean formation penetrated by drilled wellbores, and comprises injecting an aqueous composition comprising an alkali metal silicate and a gelling agent into the formation, permitting the composition to gel and maintaining the gel for such period of time as the seal is desired, whereupon an aqueous alkaline solution is then injected to destroy or disintegrate said gel plug or seal.

DETAILED DESCRIPTION OF THE INVENTION

More particularly according to the present invention, an aqueous composition containing an alkali metal (M) silicate and a gelling agent is injected into a subterranean well formation desired to be temporarily sealed or plugged, and wherein the molar ratio $SiO_2/_2O$ in said composition ranges from 2.5 to 5, the neutralization coefficient ranges from 0.25 to 1 and the concentration of silica ranges from 5 to 25% by weight with respect to the total volume of the composition, whereupon the composition is permitted to harden, with the permeability of the formation being reduced to a value sufficiently low to seal said formation against water, oil and drilling and treating fluids, while at the same time permitting the subsequent penetration therein of an alkaline solution under the conditions of temperature and pressure employed.

The permeability of the formation after sealing is preferably reduced to a value typically ranging from 1 to 10 millidarcys, which is a function of the specific formulation selected.

The process according to the invention, wherein the temporary sealing provided by silicate gels is ultimately destroyed, may be explained in terms of the volumetric contraction of the gel in the deposit. The permeability of the deposit is not completely zero after sealing and this facilitates the subsequent penetration of the alkaline solution into and within the pores of the deposit. When the alkaline solution is not in contact with the gel, the formation remains impermeable and practically tight with respect to those fluids normally encountered: water, oil, drilling fluid, and the like.

The silicates used in the sealing compositions may be the silicates or polysilicates of one or more alkali metals, preferably sodium, wherein the $SiO_2/M_2O$ molar ratio ranges from 2.5 to 5 (M=alkali metal). It is possible to use mixtures of silicates with different molar ratios and/or different alkali metals. The preferred compounds are the sodium silicates wherein the ratio $SiO_2/Na_2O$ ranges from 3 to 4.

As regards the gelling agent for the silicate, any such compound of known type that is hydrolyzable at a temperature equal to or greater than that of the formation encountered may be used, said temperature of hydrolysis typically being equal to or greater than approximately 50° to 60°. The gelling agents are advantageously selected, for example, from among the aliphatic diesters of aliphatic $C_4$–$C_{10}$ diacids, in which the alkyl group contains from 2 to 6 carbon atoms, and mixtures thereof; aliphatic diesters of phthalic acids in which the alkyl group contains from 2 to 6 carbon atoms and mixtures thereof; dialkyl and/or trialkyl phosphates in which the alkyl group contains from 2 to 6 carbon atoms and mixtures thereof; lactones and $C_3$–$C_6$ alkylamides.

Preferred gelling agents are the aliphatic diesters of $C_4$–$C_6$ diacids, in which the alkyl group contains from 2 to 6 carbon atoms and which may be used either alone or in admixture. Di-n-propyl, diisopropyl, diisobutyl succinates, glutarates and adipates, and mixtures thereof, are particularly preferred.

The relative proportions of the gelling agents and the alkali metal silicate may vary from 25 to 100 moles of the gelling agent per 100 moles of the silicate, i.e., a neutralization coefficient ranging from 0.25 to 1, preferably 0.4 to 0.8.

The initial viscosity of the mixture, the volumetric contraction of the gel and its hardness depend, among other parameters, on the silica concentration of the aqueous composition. A proportion of 5 to 25% by weight of $SiO_2$ with respect to the total weight of the solution is generally satisfactory.

Within these parameters, the specific formulation ($SiO_2/M_2O$ ratio, nature of the hardener, neutralization coefficient degree of dilution) will be determined in each particular case as a function of the temperature and of the pressure encountered in the rock formation, such as to control the hardness of the gel and provide a suitable setting time, which may range from about 1 hour to 12 hours at a temperature of from 50° to 200° C. It is generally desirable to select conditions such that the setting time is equal to or greater than about 3 hours.

In order to obtain a better injectability of the sealing composition and improved temperature stability, it may be advantageous in certain cases to add to the formulation an anionic or non-ionic surface active agent that is soluble in water.

Exemplary of the anionic surface active agents, representative are the alkaline salts of carboxylic acids, sulfonates such as alkyl and/or aryl sulfonates, sulfosuccinates, sulfates and sulfur compounds such as alkylsulfates, sulfated alcohols, sulfated polyglycol ethers, and phosphorus derivatives such as phosphated ethoxyalcohols.

Exemplary of the non-ionic surface active agents, representative are those materials obtained by the condensation of an alkylene oxide with an organic aliphatic or alkylaromatic compound. Suitable such surface active agents are polyoxyethylene alkyl phenols, polyoxyethylene alcohols, polyoxyethylene fatty acids, polyoxyethylene triglycerides, polyoxyethylene and polyoxypropylene derivatives.

In actual practice, the sealing composition is prepared by conventional alkali metal silicate gelling techniques. Typically, an aqueous solution or dispersion of the gelling agent is introduced into an aqueous solution of the alkali metal silicate maintained at ambient temperature; the surface active agent may be added at any point in time, if necessary. The composition obtained is subsequently pumped and injected by any known means into the porous rock formation to be temporarily sealed. After the required setting time has elapsed, the mixture gels and plugs the pores of the rock formation. When destruction or disintegration of the temporary plug or seal is required, an alkaline solution (e.g., sodium hydroxide, potash or lithium hydroxide) in a concentration of from 2 to 20% is injected therein. This solution, injected under pressure, slowly penetrates into the rock formation, the residual permeability of which is not entirely zero, and dissolves the gel at the rate of its permeation therein. The time for the destruction of the gel depends upon the thickness of the layer treated, the initial formulation of the gel and the conditions of the deposit. The solution obtained after the dissolution of the gel contains neither solid particles nor sealing precipitates, which makes it possible to restore the initial permeability of the producing zone.

In one particular embodiment of the invention, it may be useful, as a function of the nature of the deposit, to carry out a pre-injection of the zone to be treated with the aid of an alkaline solution, for example, a solution of sodium hydroxide, at a concentration of from 4 to 8%. This front of sodium hydroxide assures the perfect dissolution of the gel during unsealing by maintaining the zone treated at a high pH.

The process according to the invention may be applied in particular to well drilling and reconditioning operations and to tertiary recovery. During drilling, the fluid circulation losses require rapid and effective sealing, which in the conventional manner is effected by means of a mixture of cements or resins. According to the process of the invention, the aqueous composition containing the silicate and the gelling agent is injected into zones with circulation losses, the silicate allowed to gel and, following the conditioning of the wells, an alkaline solution is then injected by means of a drill rod to destroy or disintegrate the gel. In contrast to the techniques of the prior art, the process according to the invention makes it possible to completely recover the sealed zone in order to test it (oil or water zone).

The process of the invention is also applicable to the drilling of multiple producing zones. Conventionally, during the drilling of a producing zone, in order to avoid damaging the zone, the drilling fluid is changed to one that is less contaminating but less efficient. The process according to the invention may be used to temporarily seal this zone, such that, while continuing drilling toward another producing zone, the same fluid may be used. Following the destruction of the gel, the producing zone is recovered.

The process of the invention is also applicable to operations to recondition producing wells. The reconditioning fluids used to "kill" the well generally cause much damage: reduction of the absolute permeability of the formation and its fluid of the deposit. It is thus appropriate to protect the producing zone. In the case of multiple well completions, it may be necessary to insulate zones with different pressures. Temporary sealing by the process of the invention makes it possible to effectively insulate the producing zone or zones and then, following the destruction of the gel, to return the formation or formations to production by restoring the initial permeability of the rock.

The process of the invention too may be employed to recover the oil in certain formations by the injection of water (water flooding) therein. Over the course of this particular operation, differences in permeability are of great importance with regard to the efficiency of recovery. The water injected into the producing well preferentially travels through high permeability zones at the expense of zones with low permeability, while creating, more or less rapidly, a "breakthrough" in the oil deposit of low permeability. In order to prevent this phenomenon, according to one embodiment of the invention, a silicate slurry is injected through an injection well in an amount sufficient to penetrate into the most permeable zones of the formation while creating a selective seal of these zones; after the setting of the gel an alkaline solution is injected through the injection well to destroy the gel until a "breakthrough" of the alkaline solution in the low permeability zone is obtained and, finally, the injection of water (water flooding) is resumed to force the oil toward one or more producing wells. The amount of the alkaline solution to be injected may be controlled on the surface by the drop in pressure when a "breakthrough" occurs. The process has the effect of correcting the profile of the displacement of water and oil, with a reduction in the production of water and an increase in the production of oil. Furthermore, the front of the alkaline silicate solution after the destruction of the gel permits the in situ formation of surfactants, the lowering of surface tensions and the reduction in the adsorption of surfactants, providing a more efficient displacement and the improved recovery of oil.

In order to further illustrate the present invention and the advantages thereof, the following specific examples are given, it being understood that same are intended only as illustrative and in nowise limitative.

EXAMPLE 1

A Fontainebleau sandstone core, 7.45 cm in length and 3.8 cm in diameter, longitudinally coated with an epoxy resin, was used. Its initial permeability, measured with water, was 3,000 millidarcys (mD). Through one of the end portions thereof, at 60° C. and under a pressure of 1 bar, 5 pore volumes of an aqueous solution of sodium silicate and gelling agent were injected, said solution having a $SiO_2/Na_2O$ ratio of 3.3, a silica concentration of 11.4% and a neutralization coefficient of 0.3. The gelling agent was a mixture of n-propyl succinate, glutarate and adipate (COFENEX P marketed by Societe Rhone-Poulenc Specialites Chimiques).

The setting time at 60° C. was 2 hours.

After 16 hours at 60° C., the permeability measured with water was 10 mD. After 10 days at the same temperature, the permeability remained the same.

A 4% sodium hydroxide solution was then injected at 60° C. and under an initial pressure of 1 bar. Following the injection of 5 pore volumes, the permeability was 2,240 mD. After the injection of 10 pore volumes, it was 3,000 mD.

The initial permeability of the rock formation, thus, was completely restored.

EXAMPLE 2

A Berea sandstone core (length 7.45 cm, diameter 3.8 cm) having an initial permeability, measured with water, of 400 mD, was used.

The operation was carried out at 60° C.

The core, saturated with domestic fuel oil, had a relative permeability of 180 mD. After desaturation with water, the relative permeability for water was 40 mD.

The core was again saturated with fuel oil and 5 pore volumes of an aqueous solution of silicate and the gelling agent were injected, with the solution having the same characteristics as in Example 1, under a pressure of 3 bars. After 16 hours, the residual permeability, measured with fuel oil, was 2 mD.

The formation was unplugged with an 8% sodium hydroxide solution, at 60° C., under an initial pressure of 3 bars. After the injection of 7 pore volumes, the relative permeability, measured with fuel oil, was 220 mD, for an initial relative permeability of 180 mD. After desaturation with water, the relative permeability was 60 mD.

EXAMPLE 3

A Berea sandstone core (7.45 cm long, 3.8 cm in diameter) having an initial permeability, measured with water, of 200 mD, was used.

The operation was carried out at 60° C.

The core, saturated with domestic fuel oil, had a relative permeability of 100 mD. After desaturation with distilled water, the relative permeability for water was 16 mD.

Under a pressure of 3 bars, 5 pore volumes of an aqueous solution of sodium silicate and a gelling agent having a $SiO_2/Na_2O$ ratio of 3.3, a silica concentration of 22.8% and a neutralization coefficient of 0.6, were injected. The gelling agent had the same properties as in Example 1.

After 16 hours, the relative residual permeability, measured with fuel oil in the direction of the silicate injection, was 3 mD.

The relative residual permeability, measured with fuel oil in a direction reverse to the silicate injection, was 8 mD. The rock formation was unplugged by means of an 8% sodium hydroxide solution at 60° C. under an initial pressure of 3 bars. After injecting 15 pore volumes, the relative permeability, measured with fuel oil, was 94 mD, for an initial permeabiltiy of 100 mD. After desaturation with water, the permeability was 14 mD for an initial permeability of 16 mD.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for temporarily and reversibly sealing a porous, subterranean oil bearing formation penetrated by at least one wellbore, comprising plugging/sealing said formation by injecting therein a solution of an alkali metal silicate and a gelling agent therefor, permitting said alkali metal silicate and said gelling agent to harden into a relatively impermeable gel, maintaining said gel for period of plugging/sealing time desired, and thence disintegrating said relatively impermeable gel to substantially restore the initial porosity of said formation.

2. The process as defined by claim 1. comprising disintegrating said relatively impermeable gel with an alkaline solution.

3. The process as defined by claim 1, said solution of alkali metal silicate and gelling agent having a molar ratio, $SiO_2/M_2O$, ranging from 2.5 to 5, wherein M is an alkali metal, a silica concentration ranging from 5 to 25% by weight with respect to the total weight of the solution and a neutralization coefficient ranging from 0.25 to 1.

4. The process as defined by claim 3, said relatively impermeable gel being impervious to oil, water, drilling and oil well treatment fluids.

5. The process as defined by claim 3, the residual permeability of said formation, after plugging/sealing, ranging from 1 to 10 millidarcys.

6. The process as defined by claim 1, said gelling agent comprising an alkyl diester of an aliphatic $C_4$-$C_{10}$ diacid wherein the alkyl group contains 2 to 6 carbon atoms, an alkyl diester of phthalic acid wherein the alkyl group contains 2 to 6 carbon atoms, a dialkyl or trialkyl phosphate wherein the alkyl group contains 2 to 6 carbon atoms, a lactone, a $C_3$-$C_6$ alkylamide, or admixture thereof.

7. The process as defined by claim 6, said gelling agent comprising at least one alkyl diester of a $C_4$-$C_6$ diacid wherein the alkyl group contains 2 to 6 carbon atoms.

8. The process as defined by claim 6, said gelling agent comprising admixture of dipropyl succinate, glutarate and adipate.

9. The process as defined by claim 6, said gelling agent comprising admixture of dibutyl succinate, glutarate and adipate.

10. The process as defined by claim 1, said alkali metal silicate comprising a sodium silicate having a molar ratio, $SiO_2/Na_2O$, ranging from 3 to 4.

11. The process as defined by claim 1, said solution of alkali metal silicate and gelling agent therefor further comprising a surface active agent.

12. The process as defined by claim 2, said alkaline solution having a concentration ranging from 2 to 20% by weight.

13. The process as defind by claim 1, further comprising pre-injecting into said formation an aqueous alkali solution having an alkali concentration ranging from 4 to 8%.

14. The process as defined by claim 1, said oil bearing formation comprising a zone of circulating oil loss.

15. The process as defined by claim 1, said oil bearing formation comprising at least one zone of active oil production.

16. The process as defined by claim 1, said oil bearing formation comprising a zone of oil well reconditioning.

17. The process as defined by claim 1, said oil bearing formation comprising a zone of tertiary oil recovery.

18. The process are defined by claim 1, said oil bearing formation comprising a zone of tertiary oil recovery, and injecting therein a slurry of the silicate and the gelling agent in an amount sufficient to penentrate into the most permeable zones thereof and to reate a selective seal of such zones, with little or no gel being formed in zones of low permeability, next disintegrating the impermeable gel such that a breakthrough of the alkali metal silicate solution in the zones of low permeability results, and thence forcing available oil to production by liquid flooding thereof.

19. The process as defined by claim 2, said alkaline solution comprising sodium, potassium or lithium hydroxide.

* * * * *